(12) United States Patent
Helms

(10) Patent No.: US 8,884,683 B1
(45) Date of Patent: Nov. 11, 2014

(54) SEMICONDUCTOR INTEGRATED CIRCUIT AND OPERATING METHOD OF SEMICONDUCTOR INTEGRATED CIRCUIT

(71) Applicant: Samsung Electronics Co., Ltd., Suwon-si (KR)

(72) Inventor: Frank Phillip Helms, Austin, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/936,435

(22) Filed: Jul. 8, 2013

(51) Int. Cl.
*G05F 1/10* (2006.01)
*G05F 3/02* (2006.01)

(52) U.S. Cl.
CPC .................................... *G05F 3/02* (2013.01)
USPC .......................................................... 327/534

(58) Field of Classification Search
CPC ...... G06F 1/3234; G06F 1/324; G06F 1/3296
USPC .................................. 327/530, 534, 535, 538
See application file for complete search history.

(56) References Cited

U.S. PATENT DOCUMENTS

| | | | |
|---|---|---|---|
| 6,774,705 B2 * | 8/2004 | Miyazaki et al. | 327/534 |
| 7,257,723 B2 | 8/2007 | Galles | |
| 7,301,236 B2 | 11/2007 | Greco et al. | |
| 7,536,569 B2 | 5/2009 | Montero et al. | |
| 7,966,506 B2 | 6/2011 | Bodas et al. | |
| 8,006,108 B2 | 8/2011 | Brey et al. | |
| 8,195,962 B2 * | 6/2012 | Naffziger et al. | 713/300 |
| 8,201,000 B2 | 6/2012 | Boss et al. | |
| 8,314,647 B2 * | 11/2012 | Shimizu et al. | 327/534 |
| 2006/0156041 A1 | 7/2006 | Zaretsky et al. | |
| 2006/0156045 A1 | 7/2006 | Galles | |
| 2007/0087555 A1 | 4/2007 | Greco et al. | |
| 2007/0250722 A1 | 10/2007 | Montero et al. | |
| 2009/0125737 A1 | 5/2009 | Brey et al. | |
| 2009/0158067 A1 | 6/2009 | Bodas et al. | |
| 2010/0218006 A1 | 8/2010 | Boss et al. | |
| 2012/0065796 A1 | 3/2012 | Brian et al. | |
| 2012/0144215 A1 | 6/2012 | Naffziger et al. | |

FOREIGN PATENT DOCUMENTS

JP 2003-256065 A 9/2003

* cited by examiner

*Primary Examiner* — Jeffrey Zweizig
(74) *Attorney, Agent, or Firm* — Sughrue Mion, PLLC

(57) ABSTRACT

Provided are an operating method of a semiconductor integrated circuit and a semiconductor integrated circuit which includes a core circuit. The operating method includes: monitoring respective residencies of operating states of the core circuit; and controlling the operating states of the core circuit according to the monitored residencies of the operating states.

20 Claims, 13 Drawing Sheets

Residency Profile

| States of Core Circuit | Designed Residency Ratio |
|---|---|
| First state | a % |
| Second state | b % |
| ⋮ | ⋮ |
| n_th state | n % |

Fig. 8

| System States | S0 | OS is booted and running |
|---|---|---|
|  | S5 | System has been shut down from the OS perspective and OS must be re-booted |
| Performance States | P0 | Highest voltage and frequency |
|  | P1 | First intermediate voltage and frequency |
|  | P2 | Second intermediate voltage and frequency |
|  | P3 | Third intermediate voltage and frequency |
|  | P4 | Fourth intermediate voltage and frequency |
|  | P5 | Fifth intermediate voltage and frequency |
|  | P6 | Sixth intermediate voltage and frequency |
|  | P7 | Lowest voltage and frequency |
| Power States of Core Circuit | C0 | Core circuit is executing code |
|  | C1 | Core circuit is not executing code and not power gated |
|  | C2 | Core circuit is not executing code and power gated |

SEMICONDUCTOR INTEGRATED CIRCUIT AND OPERATING METHOD OF SEMICONDUCTOR INTEGRATED CIRCUIT

BACKGROUND

Apparatuses and methods consistent with exemplary embodiments relate to a semiconductor device, and more particularly, relate to a semiconductor integrated circuit and an operating method thereof.

As a semiconductor fabricating technique is developed, a semiconductor integrated circuit with various operating states may be fabricated. The operating states of the semiconductor integrated circuit may include operating states classified according to an operating speed of the semiconductor integrated circuit such as a low-performance state, an intermediate-performance state, and a high-performance state.

When the semiconductor integrated circuit is fabricated, the lifetime of the semiconductor integrated circuit may be considered. The lifetime of the semiconductor integrated circuit may be decided in view of operating states of the semiconductor integrated circuit such as the low-performance state, the intermediate-performance state, and the high-performance state. The high-performance state may enable the performance of the semiconductor integrated circuit to be improved. On the other hand, the semiconductor integrated circuit may suffer the largest stress at the high-performance state, so that the lifetime of the semiconductor integrated circuit is shortened. The low-performance state may lower the performance of the semiconductor integrated circuit. On the other hand, the semiconductor integrated circuit may suffer the smallest stress at the low-performance state, so that the lifetime of the semiconductor integrated circuit is extended. The lifetime of the semiconductor integrated circuit may be decided according to a result obtained by predicting a high-performance residency, an intermediate-performance residency, and a low-performance residency when the semiconductor integrated circuit is used by a user. A semiconductor integrated circuit capable of operating normally during the decided lifetime may be fabricated according to the decided lifetime.

However, the operating states of the semiconductor integrated circuit may not be used as forecasted. The operating states of the semiconductor integrated circuit not used as forecasted may shorten the lifetime of the semiconductor integrated circuit. This may become a factor that lowers the reliability of the semiconductor integrated circuit.

SUMMARY

According to an aspect of an exemplary embodiment, there is provided an operating method of a semiconductor integrated circuit which includes a core circuit, the operating method including: monitoring a residency of each of operating states of the core circuit; and controlling the operating states of the core circuit according to the monitored residency of each of the operating states.

The operating states may have different operating performances.

The operating states may have at least one of different operating voltages and different operating frequencies.

The residency of each of the operating states may be monitored as a ratio of a residency of each operating state to a total residency of the core circuit.

If a ratio of a residency of one of the operating states reaches a predetermined residency value, the core circuit may be inhibited from operating at the one operating state.

The monitoring may include: increasing a lifetime count value of the core circuit whenever a first count time elapses; and increasing a count value corresponding to an operating state of the core circuit whenever a second count time elapses.

The controlling may include: calculating a ratio of the count value to the lifetime count value; and inhibiting an operating state of the core circuit corresponding to the count value when the calculated ratio reaches a first residency value.

The controlling may further include: detecting an operating state, corresponding to an inhibit state, from among the operating states of the core circuit; and allowing the operating state corresponding to the inhibit state when a ratio of a count value of the operating state corresponding to the inhibit state to the lifetime count value is less than a second residency value.

The operating method may further include, when the count value reaches a predetermined residency value inhibiting an operating state of the core circuit corresponding to a ratio reaching the predetermined residency value.

The controlling may include: calculating a ratio of the count value to the lifetime count value whenever a check time elapses; and inhibiting an operating state of the core circuit corresponding to a ratio reaching a residency value when the calculated ratio reaches the residency value, until a next check time.

The lifetime count value and the count value may be backed up at a nonvolatile memory when the semiconductor integrated circuit is reset.

The lifetime count value and the count value may be reset at a nonvolatile memory when the semiconductor integrated circuit is reset.

The controlling the operating states of the core circuit according to a residency of each of the operating states may be performed based on the lifetime count value, the count value, and count values backed up at the nonvolatile memory.

The controlling the operating states of the core circuit according to a residency of each of the operating states may be performed according to the monitored result obtained by comparing the monitored residency of each of the operating states and a predetermined residency value assigned to each of the operating states.

According to an aspect of another exemplary embodiment, there is provided a semiconductor integrated circuit including: a core circuit; a voltage regulator configured to supply a voltage to the core circuit; a clock generator configured to supply a clock signal to the core circuit; a power controller configured to adjust a level of a voltage output from the voltage regulator and a frequency of the clock signal output from the clock generator; and a residency controller configured to monitor a residency when a specific voltage level and a specific frequency are supplied to the core circuit.

When the monitored residency reaches a predetermined residency value, the residency controller may control the power controller such that supplying of the specific voltage level and the specific frequency to the core circuit is blocked.

According to an aspect of another exemplary embodiment, there is provided an operating method of a semiconductor integrated circuit which includes a core circuit, the operating method including: monitoring a residency of an operating state, among a plurality of operating states, of the core circuit; and determining whether to inhibit the operating state according to the monitored residency.

According to aspects of one or more exemplary embodiments, a semiconductor integrated circuit may store design values on residencies of operating states using a residency profile. The semiconductor integrated circuit may monitor residencies of the operating states, and may control the operating states according to the residency profile. Thus, residencies of the operating states may be managed to maintain the design values. This may mean that there are provided the semiconductor integrated circuit with stable lifetime and improved reliability and an operating method thereof.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 8 is a table illustrating operating states of a semiconductor integrated circuit according to an exemplary embodiment;

DETAILED DESCRIPTION OF EXEMPLARY EMBODIMENTS

Figure 1:
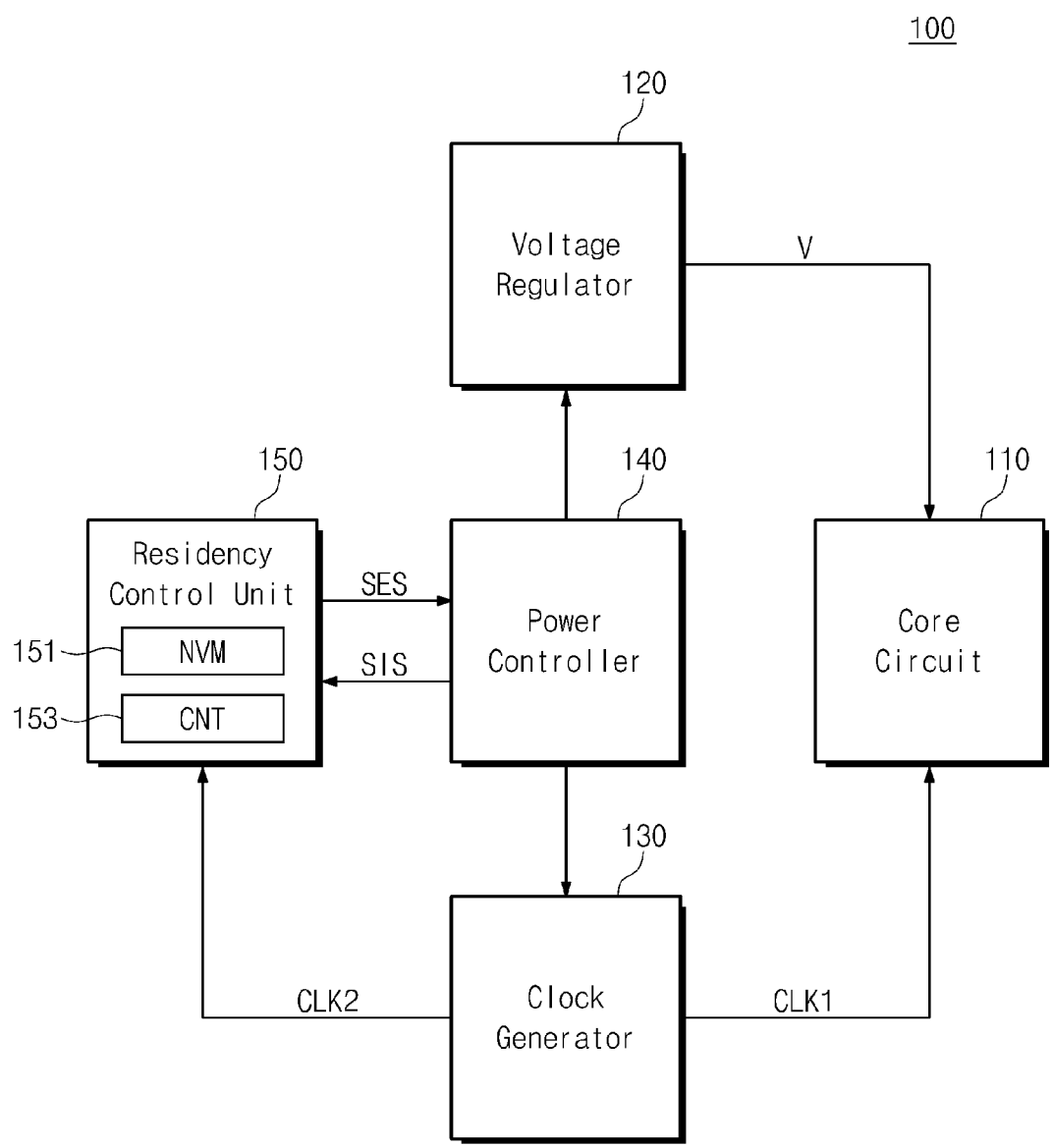
FIG. 1 is a block diagram schematically illustrating a semiconductor integrated circuit according to an exemplary embodiment.

Exemplary embodiments will be described in detail with reference to the accompanying drawings. Exemplary embodiments may, however, may be embodied in various different forms, and should not be construed as being limited only to the illustrated exemplary embodiments. Rather, these exemplary embodiments are provided as examples so that this disclosure will be thorough and complete, and will fully convey the concept of the inventive concept to those skilled in the art. Accordingly, known processes, elements, and techniques are not described with respect to some exemplary embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first," "second," "third," etc., may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of exemplary embodiments.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (e.g., rotated 90 degrees or at other orientations) and the spatially relative descriptors used herein interpreted accordingly. In addition, it will also be understood that when a layer is referred to as being "between" two layers, the layer can be the only layer between the two layers, or one or more intervening layers may also be present.

The terminology used herein is for the purpose of describing particular exemplary embodiments only and is not intended to be limiting of the inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a semiconductor integrated circuit 100 according to an exemplary embodiment. Referring to FIG. 1, a semiconductor integrated circuit 100 may include a core circuit 110, a voltage regulator 120, a clock generator 130, a power controller 140, and a residency control unit 150 (e.g., residency controller).

The core circuit 110 may be a core circuit of the semiconductor integrated circuit 100. For example, the core circuit 110 may be a core of a general-purpose processor such as an Advanced RISC Machine (ARM) core or a core of a special-purpose processor. The core circuit 110 may receive a voltage V from the voltage regulator 120 and a first clock signal CLK1 from the clock generator 130. The core circuit 110 may operate responsively to the input voltage V and the input first clock signal CLK1.

The core circuit 110 may have various operating states according to a level of the voltage V and a frequency of the first clock signal CLK1. For example, the higher a level of the voltage V and/or a frequency of the first clock signal CLK1, the higher the performance of an operating state of the core circuit 110. On the other hand, the lower a level of the voltage V and/or a frequency of the first clock signal CLK1, the lower the performance of an operating state of the core circuit 110. In this case, however, a stress of the core circuit 110 may be reduced.

The voltage regulator 120 may output the voltage V according to a control of the power controller 140. The voltage regulator 120 may control a level of the voltage V variously according to a control of the power controller 140.

The clock generator 130 may output first and second clock signals CLK1 and CLK2 according to a control of the power controller 140. The clock generator 130 may control a frequency of the first clock signal CLK1 variously according to a control of the power controller 140. The first clock signal CLK1 may be supplied to the core circuit 110. The clock generator 130 may maintain a frequency of the second clock signal CLK2 constantly. The second clock signal CLK2 may be supplied to the residency control unit 150.

The power controller 140 may be configured to control the voltage regulator 120 and the clock generator 130. The power controller 140 may control the voltage regulator 120 and the clock generator 130 to adjust a level of the voltage V and a frequency of the first clock signal CLK1. For example, the power controller 140 may receive an operating state signal from the core circuit 110, a code driven at the core circuit 110, or an external device. The operating state signal may be a signal for controlling the core circuit 110 at a specific operating state. The power controller 140 may control the voltage regulator 120 and the clock generator 130 to output the voltage V and the first clock signal CLK1 of a state selected by a state signal. The power controller 140 may output information on an operating state of the core circuit 110 as a state information signal SIS to the residency control unit 150.

The power controller 140 may receive a state enforcement signal SES from the residency control unit 150. The state enforcement signal SES may be a control for controlling the power controller 140 such that the voltage V and the first clock signal CLK1 do not have a level and a frequency corresponding to a specific state. The state enforcement signal SES can be a control for controlling the power controller 140 such that the voltage V and the first clock signal CLK1 have a level and a frequency corresponding to a specific state. The power controller 140 may control the voltage regulator 120 and the clock generator 130 in response to the state enforcement signal SES.

The residency control unit 150 may receive the second clock signal CLK2 from the clock generator 130 and the state information signal SIS from the power controller 140. The residency control unit 150 may output the state enforcement signal SES to the power controller 140. The residency control unit 150 may include a memory 151 (e.g., nonvolatile memory) and a counter 153.

The memory 151 may store residency values corresponding to operating states of the core circuit 110, respectively. The residency values may be predetermined values (e.g., predetermined duration values for operating states). The residency values may be stored at the memory 151 upon fabricating of the semiconductor integrated circuit 100. The residency values may be residencies predicted for operating states of the core circuit 110 to have or ratios of residencies.

The counter 153 may count responsively to the second clock signal CLK2. The counter 153 may include counters which correspond to operating states of the core circuit 110, respectively. A counter corresponding to an operating state of the core circuit 110 directed by the state information signal SIS may count responsively to the second clock signal CLK2.

The residency control unit 150 may monitor residencies (e.g., active durations) of operating states of the core circuit 110 in response to the state information signal SIS and the second clock signal CLK2. For example, the residency control unit 150 may monitor residencies of operating states of the core circuit 110 by monitoring count values of the counter 153 corresponding to the operating states of the core circuit 110. The residency control unit 150 may compare residency values stored at the nonvolatile memory 151 with the monitored residencies, and may control the power controller 140 to obey the residency values stored at the nonvolatile memory 151.

In the above-described exemplary embodiment, the state information signal SIS is output from the power controller 140 to the residency control unit 150. However, it is understood that one or more other exemplary embodiments are not limited thereto. For example, according to another exemplary embodiment, the state information signal SIS may be output from the core circuit 110 to the residency control unit 150. Furthermore, the residency control unit 150 may access the power controller 140 or the core circuit 110 to detect state information. The core circuit 110 or the power controller 140 may store data indicating state information at a specific register, and the residency control unit 150 may access the specific register to detect state information.

In one or more exemplary embodiments, the residency control unit 150 may be a state machine implemented by hardware, a device implemented by a combination of hardware and software, or software. In the event that the residency control unit 150 is software, the residency control unit 150 may be a code driven at the core circuit 110 or a part of an operating system (OS) including codes driven at the core circuit 110.

The nonvolatile memory 151 may be included in the residency control unit 150. However, it is understood that one or more other exemplary embodiments are not limited thereto. For example, if the residency control unit 150 is software, the nonvolatile memory 151 may be provided externally to the residency control unit 150. Further, even if the residency control unit 150 includes hardware, the nonvolatile memory 151 may be provided externally to the residency control unit 150. A location of the nonvolatile memory 151 may not be limited. The nonvolatile memory 151 may be provided outside of the residency control unit 150 or inside of the core circuit 110. The nonvolatile memory 151 may include a flash memory a magnetoresistive random access memory (MRAM), a phase-change random access memory (PRAM), a ferroelectric random access memory (FRAM), a resistive random access memory (RRAM), etc. The nonvolatile memory 151 may be a nonvolatile memory generally installed at the semiconductor integrated circuit 100 like a boot read-only memory (ROM).

The counter 153 may be included in the residency control unit 150. However, it is understood that one or more other exemplary embodiments are not limited thereto. For example, if the residency control unit 150 is software, the counter 153 may be provided externally to the residency control unit 150. Additionally, even if the residency control unit 150 includes hardware, the counter 153 may be provided externally to the residency control unit 150. A location of the counter 153 may not be limited. The counter 153 may be provided outside of the residency control unit 150 or inside of the core circuit 110.

Figures 2, 3:
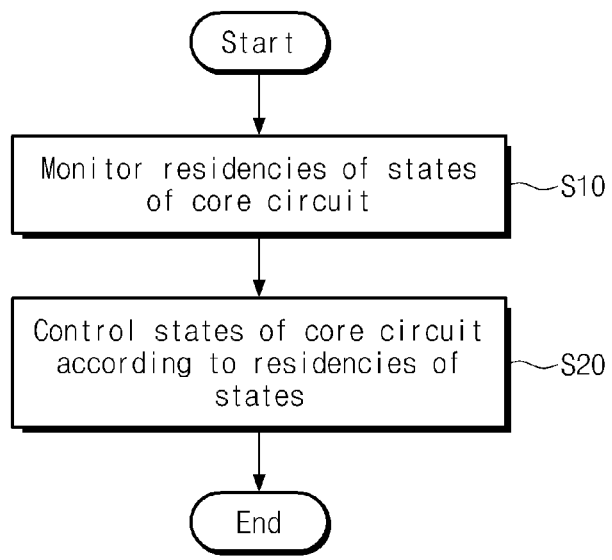
FIG. 2 is a flow chart illustrating an operating method of a semiconductor integrated circuit according to an exemplary embodiment.
FIG. 3 is a table illustrating a residency profile according to an exemplary embodiment.

FIG. 2 is a flow chart illustrating an operating method of a semiconductor integrated circuit 110 according to an exemplary embodiment. Referring to FIGS. 1 and 2, in operation S10, residencies of operating states of a core circuit 110 may be monitored. Residencies of operating states of the core circuit 110 may be monitored using a counter 153.

In operation S20, operating states of the core circuit 110 may be controlled according to the monitored residencies of the operating states. A residency control unit 150 may compare residency values stored at a nonvolatile memory 151 with residencies monitored by the counter 153. The residency control unit 150 may output a state enforcement signal SES according to a comparison result to control the operating states of the core circuit 110.

FIG. 3 is a table illustrating a residency profile according to an exemplary embodiment. A residency profile may include predicted residency values according to operating states of a core circuit 110. The residency profile may be stored at a nonvolatile memory 151.

Referring to FIGS. 1 and 3, the core circuit 110 may have a plurality of operating states. The operating states may have different levels of voltages V and different frequencies of clock signals CLK1. The residency profile may include residency values corresponding to the operating states, respectively. For example, the residency values may be ratios of residencies which the operating states have. However, it is understood that one or more other exemplary embodiments are not limited thereto. For example, according to another exemplary embodiment, the residency values may be time periods such as day, week, month, year, etc. The residency values may be values of the number of periods of a second clock signal CLK2.

Figure 4:
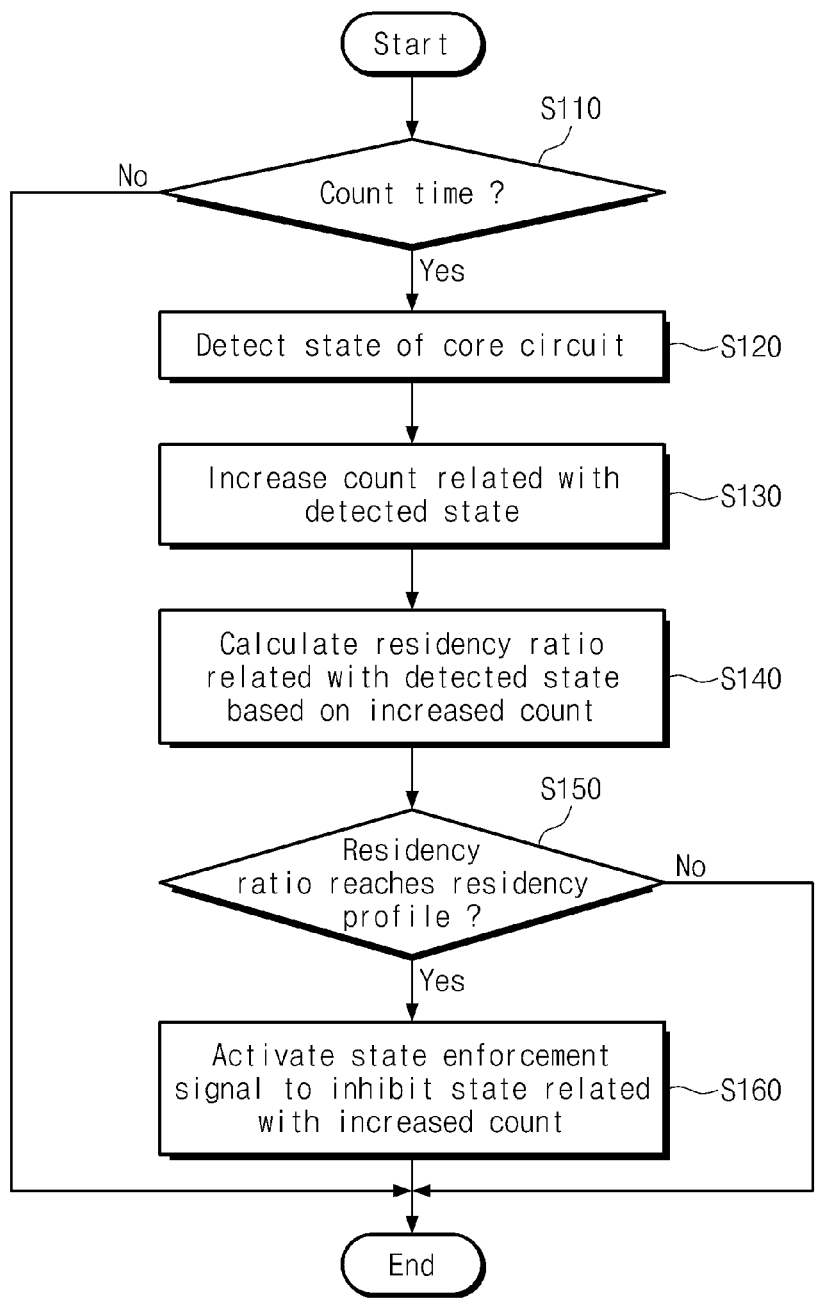
FIG. 4 is a flow chart illustrating an operating method of a residency control unit according to an exemplary embodiment.

FIG. 4 is a flow chart illustrating an operating method of a residency control unit 150 according to an exemplary embodiment.

Referring to FIGS. 1 and 4, in operation S110, whether it is a count time may be determined. A counter 153 may count based on a second clock signal CLK2. The clock signal CLK2 may have a frequency of several Mega or Giga hertz or a frequency higher than several Mega or Giga hertz. If the count 153 counts every clock of the second clock signal CLK2, the size and complexity of the counter 153 may increase. To prevent this problem, the counter 153 may count whenever a predetermined period of the second clock signal CLK2 elapses. An operation of determining whether it is a count time may be an operation of determining whether it is a time when the counter 153 counts. For example, in the event that a frequency of the second clock signal CLK2 is low so as to not excessively increase a size of the counter 153, operation S110 may be skipped. For example, if the frequency of the second clock signal CLK2 ranges from several hundred microseconds to several milliseconds, operation S110 may be skipped.

If it is not a count time, a residency control unit 150 may not perform an operation separately (i.e., the method may end). If it is a count time, the method proceeds to operation S120.

In operation S120, an operating state of a core circuit 110 may be detected. For example, the residency control unit 150 may detect an operating state of the core circuit 110 based on a state information signal SIS.

In operation S130, a count associated with the detected operating state may increase. The counter 153 may increase a count corresponding to an operating state directed by the state information signal SIS.

In operation S140, a residency ratio associated with the detected operating state may be calculated based on the increased count. The residency control unit 150 may calculate a residency ratio of an operating state counted with respect to the whole operating time of the core circuit 110. The residency control unit 150 may calculate the whole operating time (or count) of the core circuit 110 from a counter configured to count the whole operating time or from a sum of counts of counters configured to count residencies of operating states of the core circuit 110. The residency control unit 150 may calculate a ratio of the increased count to the whole operating time.

In operation S150, whether a residency ratio reaches a residency value of a residency profile may be determined. The residency control unit 150 may compare the residency ratio calculated in operation S140 with a residency value, corresponding to an operating state the count of which increases, from among residency values of the residency profile stored at the nonvolatile memory 151. If the residency ratio does not reach the residency profile, the residency control unit 150 may not perform an operation separately (i.e., the method may end). That is, when defined residency values of the residency profile are obeyed, the residency control unit 150 may not perform an operation separately.

If the residency ratio does reach the residency value of the residency profile, the method proceeds to operation S160. In operation S160, a state enforcement signal SES may be activated, so that an operating state associated with the increased count is inhibited. The residency control unit 150 may output the state enforcement signal SES not to have an operating state associated with the increased count. For example, the residency control unit 150 may output the state enforcement signal SES to inhibit a corresponding operating state. The residency control unit 150 may inhibit a corresponding operating state, and may output the state enforcement signal SES to have an operating state with a lower performance. The residency control unit 150 may inhibit a corresponding operating state, and may output the state enforcement signal SES to have an operating state with a higher performance.

That is, when a residency of a specific operating state of the core circuit 110 reaches a limit value defined by the residency profile, the residency control unit 150 may control the power controller 140 to not have a specific operating state. Thus, if the residency profile of the core circuit 110 is obeyed, the lifetime and reliability of the core circuit 110 and the semiconductor integrated circuit 100 may be secured.

In operation S150, there is described an example in which the residency control unit 150 determines whether a residency ratio reaches a residency value of the residency profile. However, in one or more other exemplary embodiments, the residency control unit 150 can be modified or applied to determine whether a residency ratio reaches a value larger or smaller, by a threshold value, than a residency value of the residency profile.

The residency control unit 150 may perform an operating method of FIG. 4 upon a transition of the second clock signal CLK2.

Figure 5:
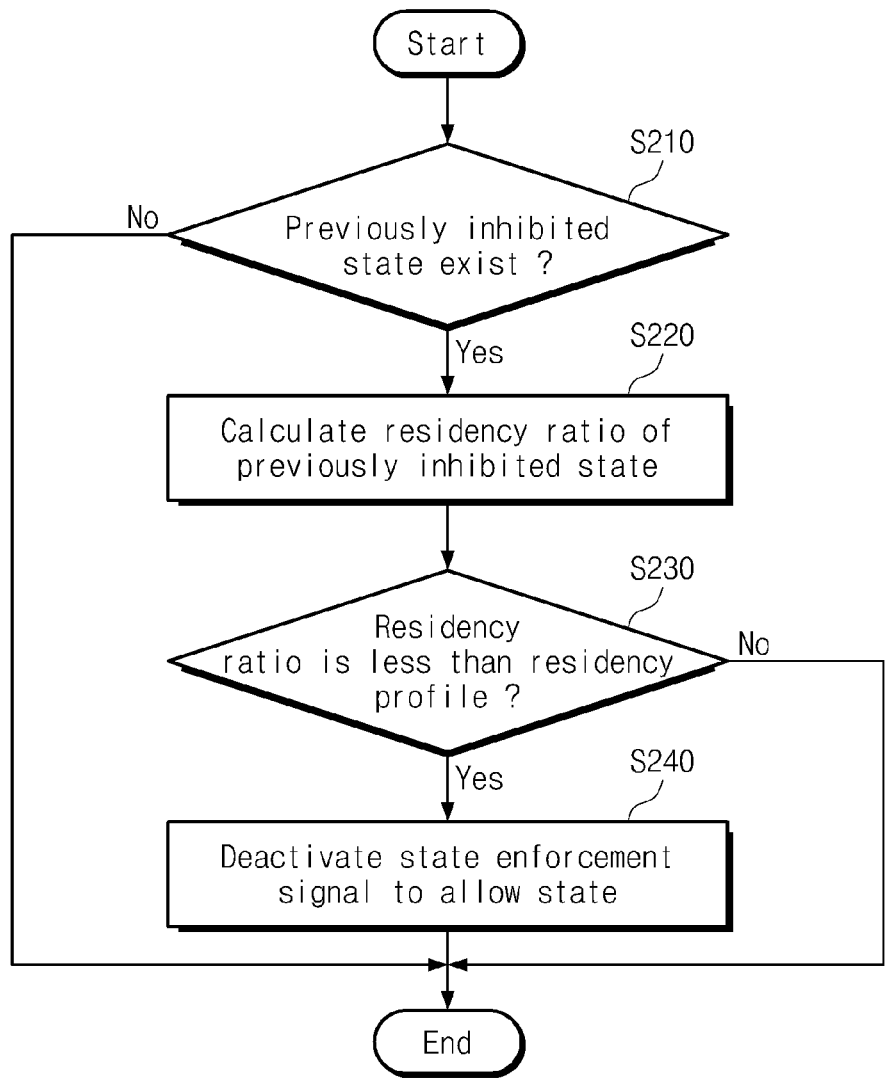
FIG. 5 is a flow chart illustrating an operating method of a residency control unit according to another exemplary embodiment.

FIG. 5 is a flow chart illustrating an operating method of a residency control unit 150 according to another exemplary embodiment. In one or more exemplary embodiments, an operating method of FIG. 5 may be performed following an operating method of FIG. 4. Referring to FIGS. 1 and 5, in operation S210, whether a previously inhibited operating state exists may be determined. A residency control unit 150 may determine whether an operating state the previous count time of which is inhibited exists. If an operating state the previous count time of which is inhibited does not exist, the residency control unit 150 may not perform an operation separately (i.e., the method may end). If an operating state the previous count time of which is inhibited exists, the method proceeds to operation S220.

In operation S220, a residency ratio of the inhibited operating state may be calculated. The residency control unit 150 may calculate a residency ratio based on a count of the inhibited operating state.

In operation S230, whether the residency ratio of the inhibited operating state is less than a residency profile may be determined. The residency control unit 150 may compare a count of the inhibited operating state with a residency value of the residency profile stored at a nonvolatile memory 151. If the residency ratio of the inhibited operating state is not less than the residency value of the residency profile, the residency control unit 150 may not perform an operation separately (i.e., the method may end). If the residency ratio of the inhibited operating state is less than the residency value of the residency profile, the method proceeds to operation S240.

In operation S240, a state enforcement signal SES inhibiting the inhibited operating state may be inactivated, so that the inhibited operating state is allowed.

In one or more exemplary embodiments, modification and application of operation S230 may be made such that the residency control unit 150 determines whether a residency ratio is smaller or greater, by a threshold value, than a residency value of the residency profile.

In one or more example embodiments, the residency control unit 150 may perform operations of FIGS. 4 and 5 every period of a second clock signal CLK2.

Figure 6:
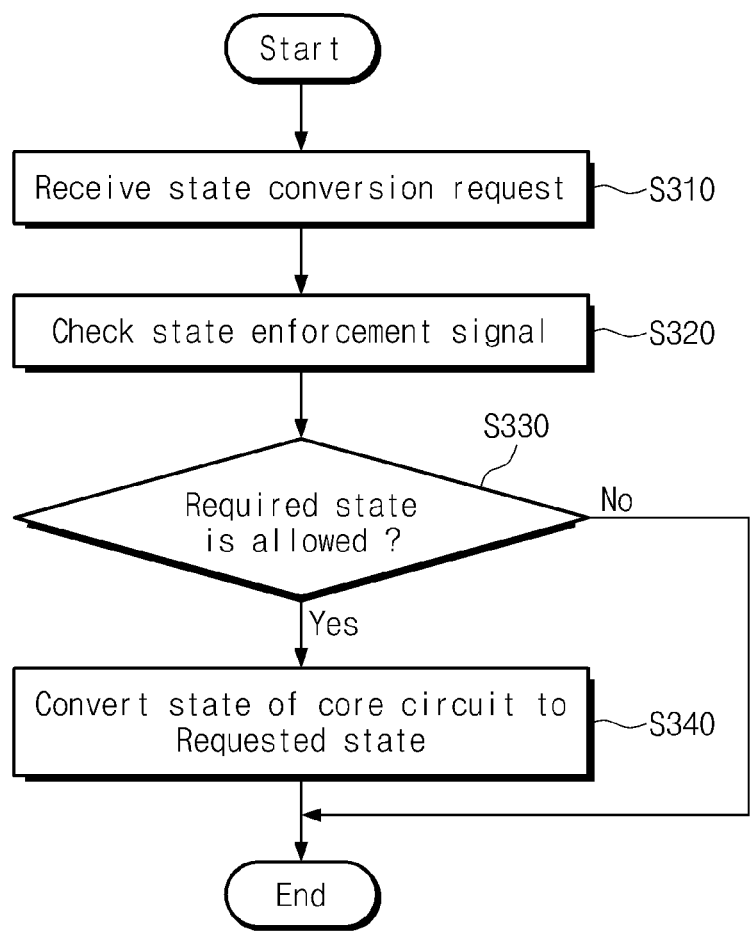
FIG. 6 is a flow chart illustrating an operating method of a power controller according to an exemplary embodiment.

FIG. 6 is a flow chart illustrating an operating method of a power controller 140 according to an exemplary embodiment. Referring to FIGS. 1 and 6, in operation S310, a state conversion request may be received. For example, a power controller 140 may receive an operating state signal requesting switching of an operating state of a core circuit 110 from a core circuit 110, a code driven at the core circuit 110, or an external device.

In operation S320, the power controller 140 may check a state enforcement signal SES.

In operation S330, whether a requested operating state is allowed may be determined. The power controller 140 may check whether an operating state requested by the operating state signal is inhibited by the state enforcement signal SES or allowed.

If the operating state requested by the operating state signal is determined not to be allowed, the power controller 140 may ignore an operating state change request. If the operating state requested by the operating state signal is determined to be allowed, the power controller 140 may switch an operating state of the core circuit 110 into the requested operating state. For example, the core circuit 110 may control a voltage regulator 120 and a clock generator 130 to adjust at least one of a level of a voltage V and a frequency of a first clock signal CLK1.

When the requested operating state is inhibited, the power controller 140 may control the voltage regulator 120 and the clock generator 130 such that the core circuit 110 operates at an operating state lower or higher, for example, by one step than the requested operating state, instead of ignoring the requested operating state.

Figure 7:
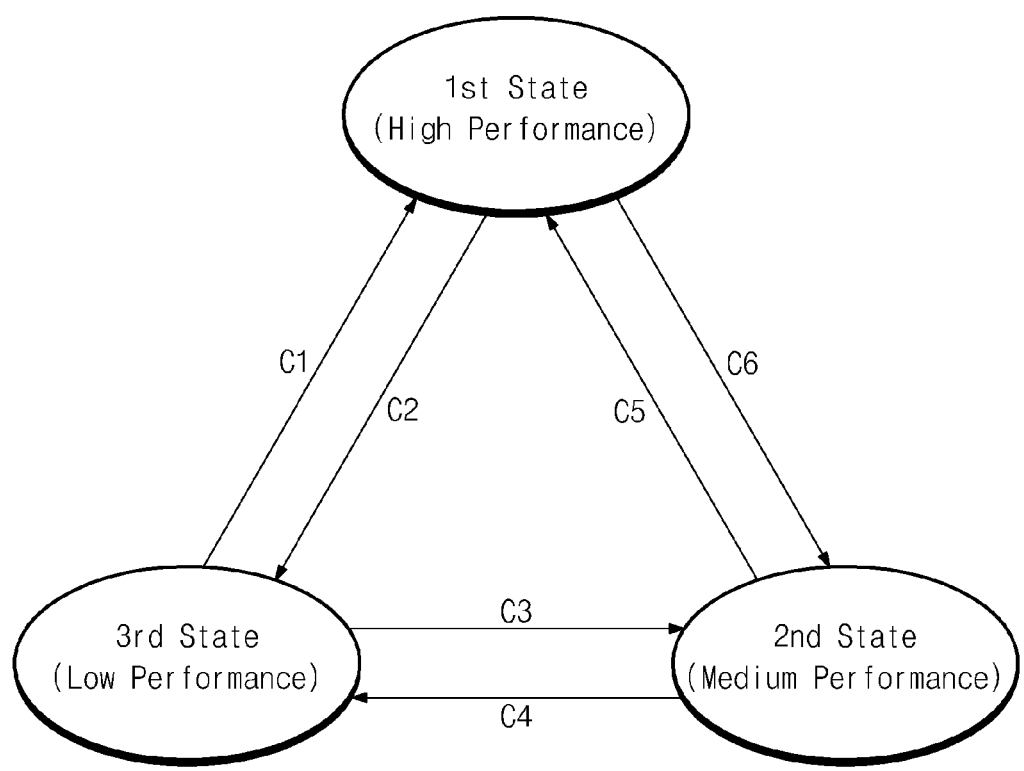
FIG. 7 is a state diagram illustrating a method of controlling operating states of a core circuit according to an exemplary embodiment.

FIG. 7 is a state diagram illustrating a method of controlling operating states of a core circuit 110 according to an exemplary embodiment. Referring to FIG. 7, by way of example, a core circuit 110 may have first to third operating states. However, it is understood that one or more other exemplary embodiments are not limited thereto, and may include less than or greater than three operating states.

Operating states of the core circuit 110 may be changed by first to sixth controls C1 to C6. The following table 1 show conditions at which the first to sixth controls may be performed.

TABLE 1

| Control | Condition 1 | Condition 2 | Description |
|---|---|---|---|
| C1 | 1OS requested | No inhibit state of 1OS | 3OS to 1OS switching |
| C2 | 3OS requested | No inhibit state of 3OS | 1OS to 3OS switching |
| C3 | 2OS requested | No inhibit state of 2OS | 3OS to 2OS switching |
| C4 | 3OS requested | No inhibit state of 3OS | 2OS to 3OS switching |
| C5 | 1OS requested | No inhibit state of 1OS | 2OS to 1OS switching |
| C6 | 2OS requested | No inhibit state of 2OS | 1OS to 2OS switching |

In the table 1, "OS" indicates an operating state.

FIG. 8 is a table illustrating operating states of a semiconductor integrated circuit 100 according to an exemplary embodiment. Referring to FIGS. 1 and 8, operating states of a semiconductor integrated circuit 100 may be divided into a system state, an operating performance state, and a power state of a core circuit 110.

A system state S0 may indicate such a state that an operating system driven by the semiconductor integrated circuit 100 is booted and operates. At a system state S5, a system including the semiconductor integrated circuit 100 may be shut down and the operating system is to be rebooted.

Operating performance states P0 to P7 may indicate operating performances of a core circuit 110 according to each voltage (V) level and each clock (CLK1) frequency.

Under a power state C0, the core circuit 110 may execute a code. A power state C1 may indicate such a state that the core circuit 110 is not executing a code and not power gated. A power state C2 may indicate a state in which the core circuit 110 is not executing a code and power gated. Herein, the term "power gated" may indicate that when the core circuit 110 is at an idle state, a power supplied to a portion, having low importance, from among components of the core circuit 110 is blocked.

Figure 9:
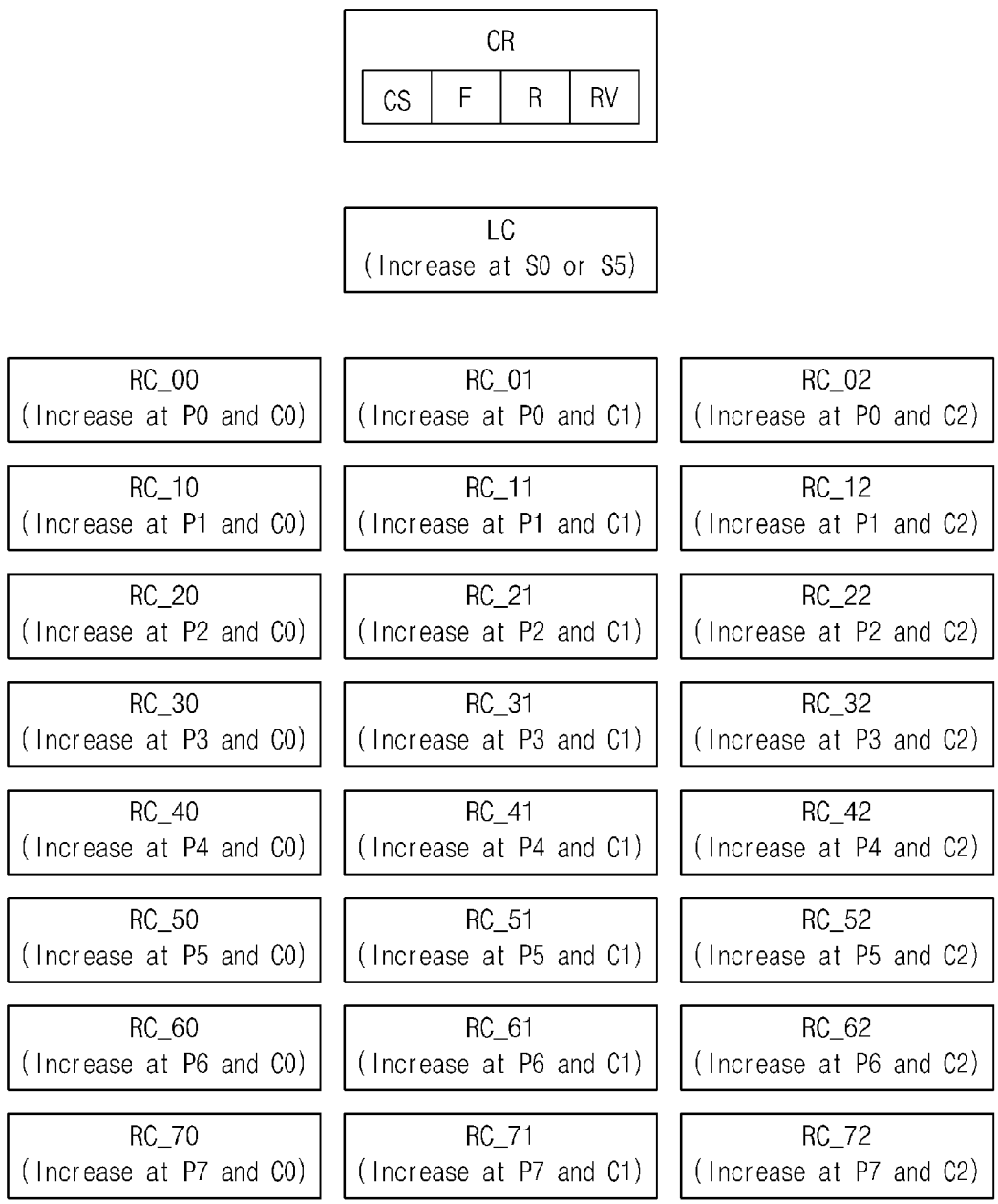
FIG. 9 is a block diagram illustrating a counter according to an exemplary embodiment.

FIG. 9 is a block diagram illustrating a counter 153 according to an exemplary embodiment. Referring to FIGS. 1 and 9, a counter 153 may include a control register CR, a lifetime counter LC, and residency counters RC_00 to RC_70, RC_01 to RC_71, and RC_02 to RC_72.

The control register CR may store information for controlling the counter 153. The control register CR may be programmed by a residency control unit 150, a core circuit 110, or an external device. The control register CR may include a clock selection bit CS, a frozen bit F, a reset bit R, and a reserved bit RV.

The clock selection bit CS may adjust a count time. For example, a count time may be set to a first value or a second value according to the clock selection bit CS.

The frozen bit F may store information on whether the lifetime counter LC and the residency counters RC_00 to RC_70, RC_01 to RC_71, and RC_02 to RC_72 perform a count operation.

The reset bit R may store information on whether the lifetime counter LC and the residency counters RC_00 to RC_70, RC_01 to RC_71, and RC_02 to RC_72 perform a reset operation. For example, when a core circuit 110 or a semiconductor integrated circuit 100 is reset (e.g., cold reset), the lifetime counter LC and the residency counters RC_00 to RC_70, RC_01 to RC_71, and RC_02 to RC_72 may be reset according to the reset bit R.

The lifetime counter LC may count a total residency of the core circuit 110 (e.g., a total of residencies of all operating states). The lifetime counter LC may count under system states S0 and S5 of FIG. 8.

The residency counters RC_00 to RC_70 may be counters corresponding to operating performance states P0 to P7 under a power state C0. The residency counters RC_01 to RC_71 may be counters corresponding to operating performance states P0 to P7 under a power state C1. The residency counters RC_02 to RC_72 may be counters corresponding to operating performance states P0 to P7 under a power state C2.

A nonvolatile memory 151 may store a residency profile including residency values corresponding to the residency counters RC_00 to RC_70, RC_01 to RC_71, and RC_02 to RC_72, respectively.

For example, a count time of the lifetime counter LC may be one millisecond and count times of the residency counters RC_00 to RC_70, RC_01 to RC_71, and RC_02 to RC_72 may be 100 microseconds.

For example, when the core circuit 110 or the semiconductor integrated circuit 100 is reset (e.g., cold reset), counts of the lifetime counter LC and the residency counters RC_00 to RC_70, RC_01 to RC_71, and RC_02 to RC_72 may be copied (or backed up) at the nonvolatile memory 151. The residency control unit 150 may gather counts backed up at the nonvolatile memory 151 and counts of the lifetime counter LC and the residency counters RC_00 to RC_70, RC_01 to RC_71, and RC_02 to RC_72 to compare a gathering result with a residency profile stored at the nonvolatile memory 151.

For example, the clock selection bit CS may be used to adjust a frequency of a second clock signal CLK2, not counts of the lifetime counter LC and the residency counters RC_00 to RC_70, RC_01 to RC_71, and RC_02 to RC_72.

Figure 10:
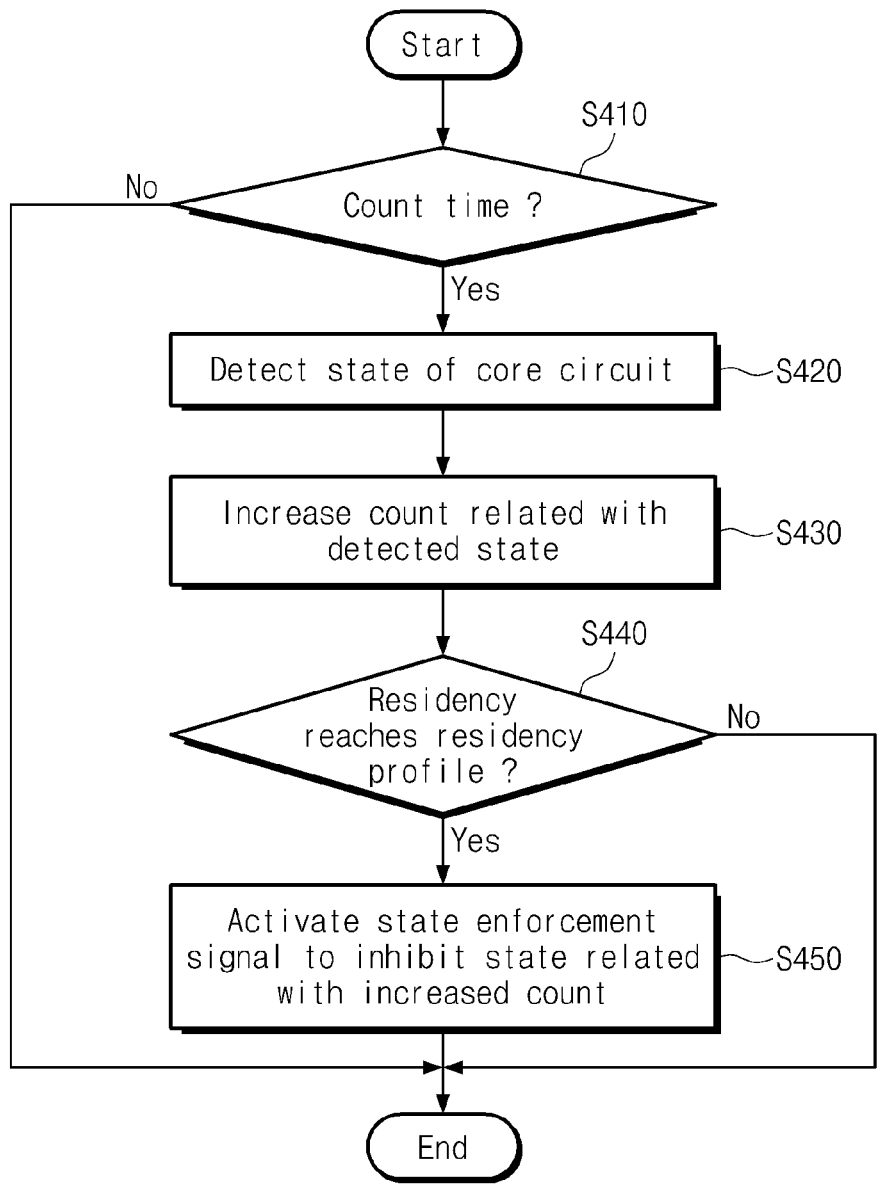
FIG. 10 is a flow chart illustrating an operating method of a residency control unit according to another exemplary embodiment.

FIG. 10 is a flow chart illustrating an operating method of a residency control unit 150 according to another exemplary embodiment. Referring to FIGS. 1 and 10, operations S410 to S430 may be substantially the same as or similar to operations S110 to S130 of FIG. 4.

In operation S440, whether a residency reaches a value of a residency profile may be determined. If the residency is determined not to reach the value of the residency profile, a residency control unit 150 may not perform an operation separately (i.e., the method may end). If the residency is determined to reach the value of the residency profile, in operation S450, a state enforcement signal SES may be activated so that an operating state associated with an increased count is inhibited.

Compared with an operating method of FIG. 4, the residency control unit 150 may use a residency for comparison instead of a residency ratio. If a residency assigned to a specific operating state is consumed, the residency control unit 150 may inhibit the specific operating state. For example, the residency control unit 150 may inhibit the specific operating state permanently.

Figure 11:
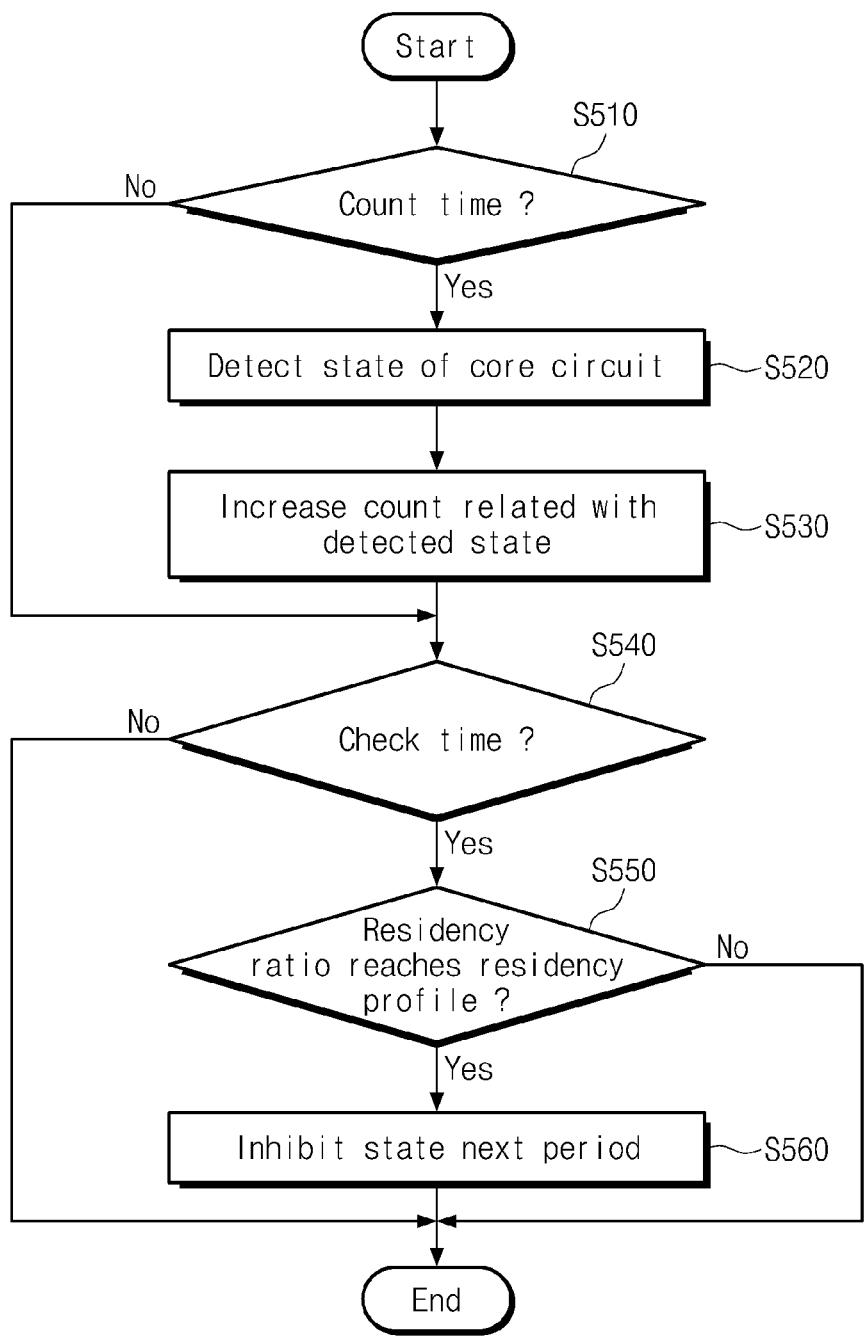
FIG. 11 is a flow chart illustrating an operating method of a residency control unit according to still another exemplary embodiment.

FIG. 11 is a flow chart illustrating an operating method of a residency control unit 150 according to still another exemplary embodiment. Referring to FIGS. 1 and 11, operations S510 to S530 may be substantially the same as or similar to operations S110 to S130 of FIG. 4.

In operation S540, whether it is a check time may be determined. A residency control unit 150 may periodically check a residency of a core circuit 110, independently from a count time. Operation S540 may be an operation of determining whether it is a time when a residency is checked.

If it is not a check time, the residency control unit 150 may not perform an operation separately (i.e., the method may end). If it is a check time, the method proceeds to operation S550.

In operation S550, whether a residency ratio reaches a value of a residency profile may be determined. Operation S550 may correspond to operation S150 in FIG. 4. If the residency ratio is determined not to reach the value of the residency profile, the residency control unit 150 may not perform an operation separately (i.e., the method may end). If the residency ratio is determined to reach the residency profile, the method proceeds to operation S560.

In operation S560, an operating state may be inhibited at a next period. The residency control unit 150 may inhibit an operating state corresponding to a residency ratio reaching the value of the residency profile until a next check time.

Compared with an operating method of FIG. 4, the operating method of FIG. 11 may perform a comparison between a residency ratio and a residency profile whenever a check time elapses.

In one or more exemplary embodiments, the operating method of FIG. 11 may be applicable to a server. The server may be accessed by a plurality of users. The users may have specific activity patterns. For example, the users may do more activities in the daytime, and may do fewer activities at night. That is, an access frequency of the server may change with time.

According to the exemplary embodiment of FIG. 11, comparison on a residency may be performed whenever a check time elapses. If the check time is set to level an access frequency, the lifetime and reliability of the core circuit 110 or the semiconductor integrated circuit 100 may be secured without excessive limiting of the operating performance of the core circuit 110 or the semiconductor integrated circuit 100.

Figure 12:
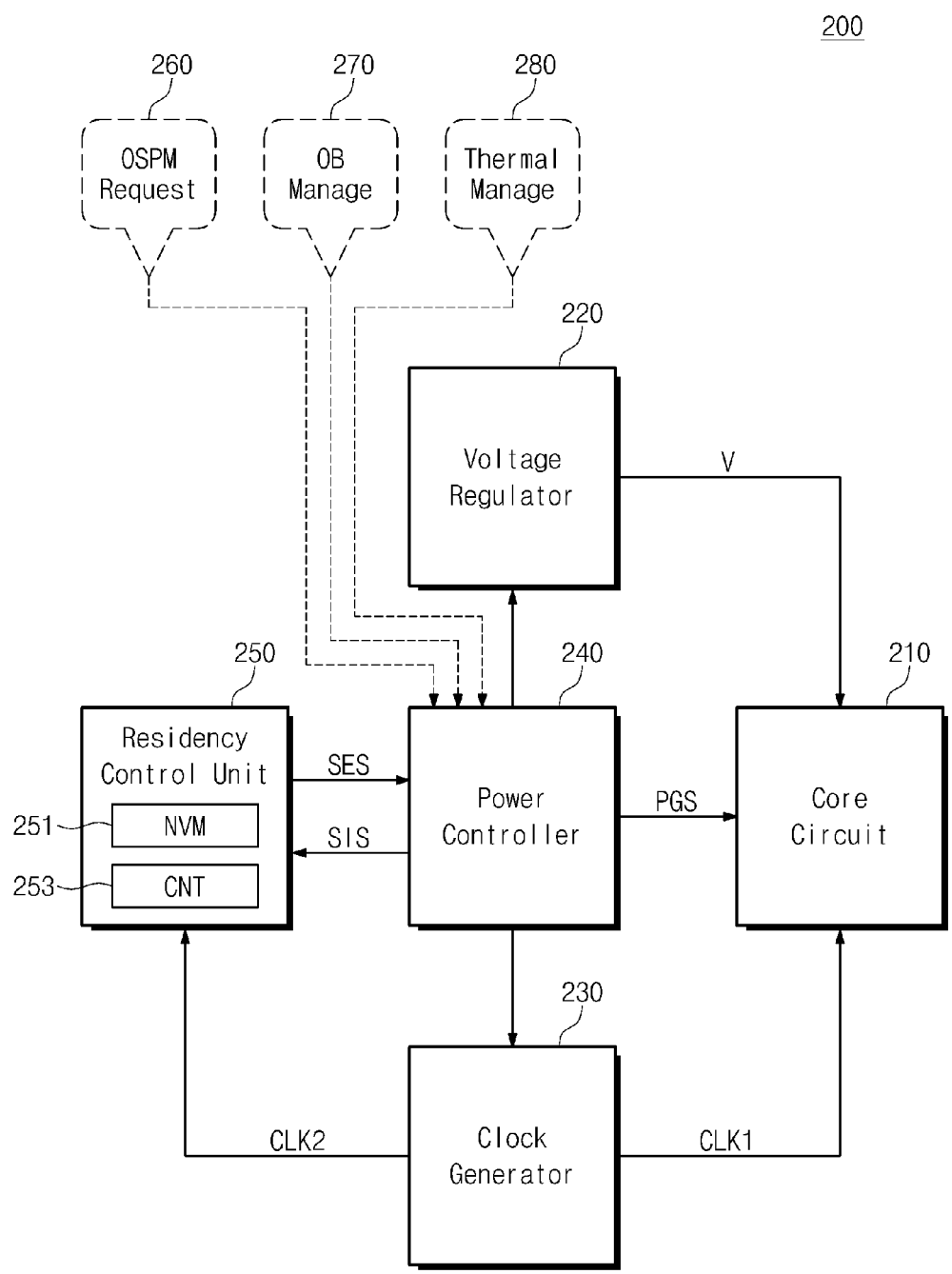
FIG. 12 is a block diagram schematically illustrating an application of a semiconductor integrated circuit of FIG. 1.

FIG. 12 is a block diagram schematically illustrating an application of a semiconductor integrated circuit 200 according to an exemplary embodiment. Referring to FIG. 12, a semiconductor integrated circuit 200 may include a core circuit 210, a voltage regulator 220, a clock generator 230, a power controller 240, and a residency control unit 250 (e.g., residency controller). The residency control unit 250 may include a memory 251 (e.g., nonvolatile memory) and a counter 253.

Compared with a semiconductor integrated circuit 100 of FIG. 1, there is illustrated operating state signals 260, 270, and 280 which the power controller 240 of the semiconductor integrated circuit 200 receives.

For example, the power controller 240 may receive a first operating state signal 260 from an Operating System Power Management (OPSM). The OPSM may be a part of an operating system. The OPSM may send the first operating state signal 260 to the power controller 240 according to a code to be processed or the amount of data to be processed.

In the present exemplary embodiment, the power controller 240 may receive a second operating state signal 270 from an out-of-band (OB). The OB may be management located external to an operating system driven by the core circuit 210 or the semiconductor integrated circuit 200. For example, when the core circuit 210 or the semiconductor integrated circuit 200 is at a data center, the OB may exist external to the operating system driven by the core circuit 210 or the semiconductor integrated circuit 200. In terms of resource management, the OB may send the second operating state signal 270 requesting switching of an operating state of the core circuit 210 or the semiconductor integrated circuit 200.

In the present exemplary embodiment, the power controller 240 may receive a third operating state signal 280 from thermal management. The thermal management may be located at the semiconductor integrated circuit 200. The thermal management may send the third operating state signal 280 requesting switching of an operating state of the core circuit 210 or the semiconductor integrated circuit 200 according to a temperature of the semiconductor integrated circuit 200.

The power controller 240 may identify a state enforcement signal SES received from the residency control unit 250 as an operating state signal. The power controller 240 may control an operating state of the core circuit 210 according to a request corresponding to an operating state signal, having the lowest operating performance, from among operating state signals received from the external source.

The power controller 240 may output a power gating signal PGS to the core circuit 210. The power gating signal PGS may be a signal for blocking a power supplied to some power domains of power domains of the core circuit 210. The power controller 240 may control power gating of the core circuit 210 in response to at least one of the first to third operating state signals 260 to 280 received from the external source.

Figure 13:
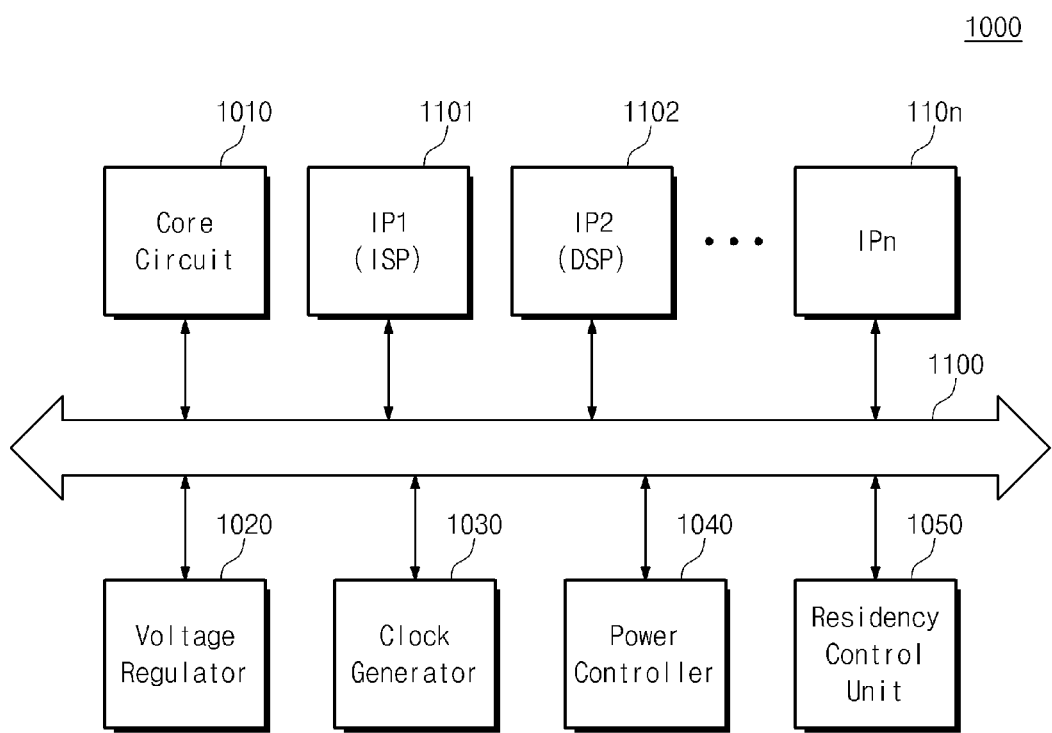
FIG. 13 is a block diagram schematically illustrating a System-on-Chip according to an exemplary embodiment.

FIG. 13 is a block diagram schematically illustrating a System-on-Chip (SoC) 1000 according to an exemplary embodiment. Referring to FIG. 13, a System-on-Chip 1000 may include a core circuit 1010, a voltage regulator 1020, a clock generator 1030, a power controller 1040, a residency control unit 1050 (e.g., residency controller), a bus 1100, and a plurality of Intellectual Properties (IPs) 1101 to 110n.

The core circuit 1010, the voltage regulator 1020, the clock generator 1030, the power controller 1040, and the residency control unit 1050 may correspond to a core circuit 110, a voltage regulator 120, a clock generator 130, a power controller 140, and a residency control unit 150 of FIG. 1, respectively.

The bus 1100 may provide a channel among components of the SoC 1000.

The IPs 1101 to 110n may be components provided at the SoC 1000 according to a predetermined design. The IPs 1101 to 110n may include an image signal processor, a digital signal processor, etc.

In the present exemplary embodiment, the core circuit 1010 and the IPs 1101 to 110n may have various operating states. Various voltage levels and various clock frequencies may be provided to the voltage regulator 1020, the clock generator 1030, and the IPs 1101 to 110n. The residency control unit 1050 may control the power controller 1040 to adjust operating states of the core circuit 1010 and the IPs 1101 to 110n.

In the present exemplary embodiment, the voltage regulator 1020, the clock generator 1030, the power controller 1040, and the residency control unit 1050 may be formed of IPs, respectively.

Figure 14:
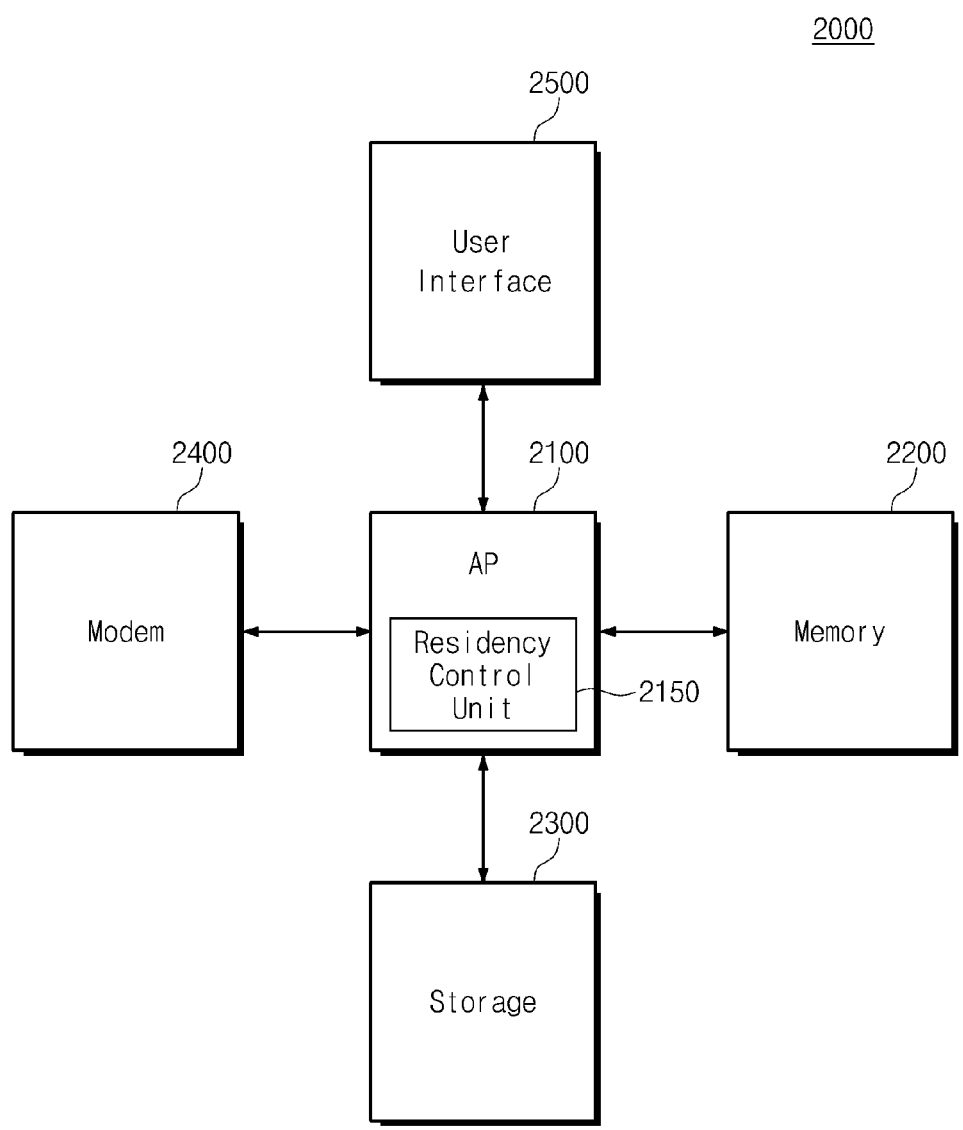
FIG. 14 is a block diagram schematically illustrating a mobile device according to an exemplary embodiment.

FIG. 14 is a block diagram schematically illustrating a mobile device 2000 according to an exemplary embodiment. Referring to FIG. 14, a mobile device 2000 may include an application processor 2100, a memory 2200, storage 2300, a modem 2400, and a user interface 2500.

The application processor 2100 may control an overall operation of the mobile device 2000, and may perform a logic operation. The application processor 2100 may include a semiconductor integrated circuit 100 or 200 described with reference to FIG. 1 or 12. The application processor 2100 may include a System-on-Chip 1000 described with reference to FIG. 13. The application processor 2100 may include a residency control unit 2150. The residency control unit 2150 may compare a residency of an operating state of a core circuit of the application processor 2100 or each IP with a residency profile, and may control operating states of the core circuit of the IPs according to a comparison result.

The memory 2200 may communicate with the application processor 2100. The memory 2200 may be a working memory (or main memory) of the application processor 2100 or the mobile device 2000. The memory 2200 may include volatile memories such as a Static RAM (SRAM), a Dynamic RAM (DRAM), a Synchronous DRAM (SDRAM), etc., or nonvolatile memories such as a flash memory, a PRAM, an MRAM, an RRAM, an FRAM (Ferroelectric RAM), etc.

The storage 2300 may store data which the mobile device 2000 retains in the long term. The storage 2300 may include a hard disk drive or nonvolatile memories such as a flash memory, a PRAM, an MRAM, an RRAM, an FRAM, etc.

In one or more exemplary embodiments, the memory 2200 and the storage 2300 may include the same type of nonvolatile memories. In this case, the memory 2200 and the storage 2300 may be integrated to a semiconductor integrated circuit.

The modem 2400 may communicate with an external device according to a control of the application processor 210. For example, the modem 2400 may perform wire or wireless communications with the external device. The modem 2400 may communicate based on at least one of various wireless communications manners such as Long Term Evolution (LTE), WiMax, Global System for Mobile communication (GSM), Code Division Multiple Access (CDMA), Bluetooth, Near Field Communication (NFC), WiFi, Radio Frequency Identification (RFID), and so on or various wire communications manners such as Universal Serial Bus (USB), Serial AT Attachment (SATA), Small Computer Small Interface (SCSI), Firewire, Peripheral Component Interconnection (PCI), etc.

The user interface 2500 may communicate with a user according to a control of the application processor 2100. For example, the user interface 2500 may include user input interfaces such as a keyboard, a key pad, a button, a touch panel, a touch screen, a touch pad, a touch ball, a camera, a microphone, a gyroscope sensor, a vibration sensor, and so on. The user interface 2500 may include user output interfaces such as a Liquid Crystal Display (LCD) device, an Organic Light Emitting Diode (OLED) display device, an Active Matrix OLED (AMOLED) display device, an LED, a speaker, a motor, etc.

While exemplary embodiments have been described above, it will be apparent to those skilled in the art that various changes and modifications may be made without departing from the spirit and scope of the present inventive concept. Therefore, it should be understood that the above-described exemplary embodiments are not limiting, but illustrative.

What is claimed is:

1. An operating method of a semiconductor integrated circuit which includes a core circuit, the operating method comprising:
   monitoring respective residencies of operating states of the core circuit; and
   controlling the operating states of the core circuit according to the monitored residencies of the operating states,
   wherein the residencies of the operating states are monitored as ratios of the respective residencies of the operating states to a total residency of the core circuit.

2. The operating method of claim 1, wherein the operating states have different operating performances.

3. The operating method of claim 1, wherein the operating states have at least one of different operating voltages and different operating frequencies.

4. The operating method of claim 1, wherein the controlling comprises, in response to a ratio of a residency of a first operating state, from among the operating states of the core circuit, reaching a predetermined residency value, inhibiting the core circuit from operating at the first operating state.

5. The operating method of claim 1, wherein the monitoring comprises:
   increasing a lifetime count value of the core circuit whenever a first count time elapses; and
   increasing a count value corresponding to a first operating state of the core circuit whenever a second count time elapses.

6. The operating method of claim 5, wherein the controlling comprises:
   calculating a ratio of the count value to the lifetime count value; and
   inhibiting the first operating state of the core circuit corresponding to the count value in response to the calculated ratio reaching a first residency value.

7. The operating method of claim 6, wherein the controlling further comprises:
   detecting a second operating state, corresponding to an inhibit state, from among the operating states of the core circuit; and
   allowing the second operating state when a ratio of a count value of the second operating state to the lifetime count value is less than a second residency value.

8. The operating method of claim 5, further comprising:
   in response to the count value reaching a predetermined residency value, inhibiting the first operating state of the core circuit corresponding to the count value.

9. The operating method of claim 5, wherein the controlling comprises:
   calculating a ratio of the count value to the lifetime count value whenever a check time elapses; and
   inhibiting the first operating state of the core circuit in response to the calculated ratio reaching the residency value, until a next check time.

10. The operating method of claim 5, wherein the lifetime count value and the count value are reset at a nonvolatile memory when the semiconductor integrated circuit is reset.

11. The operating method of claim 5, wherein the lifetime count value and the count value are backed up at a nonvolatile memory when the semiconductor integrated circuit is reset.

12. The operating method of claim 11, wherein the controlling the operating states of the core circuit is performed based on the lifetime count value, the count value, and count values backed up at the nonvolatile memory.

13. The operating method of claim 1, wherein the controlling the operating states of the core circuit is performed according to a result obtained by comparing the monitored residencies of the operating states and predetermined residency values respectively assigned to the operating states.

14. A semiconductor integrated circuit comprising:
   a core circuit;
   a voltage regulator configured to supply a voltage to the core circuit;
   a clock generator configured to supply a clock signal to the core circuit;
   a power controller configured to adjust a level of a voltage output from the voltage regulator and a frequency of the clock signal output from the clock generator; and
   a residency controller configured to monitor a residency when a first voltage level and a first frequency are supplied to the core circuit,
   wherein in response to the monitored residency reaching a predetermined residency value, the residency controller controls the power controller such that supplying of the first voltage level and the first frequency to the core circuit is blocked, and
   wherein the monitored residency is a ratio of the residency of an operating state corresponding to the first voltage level and the first frequency, from among a plurality of operating states of the core circuit, to a total residency of the core circuit.

15. The semiconductor integrated circuit of claim 14, wherein the residency controller is configured to increase a lifetime count value of the core circuit whenever a first count time elapses, and to increase a count value corresponding to the operating state whenever a second count time elapses.

16. An operating method of a semiconductor integrated circuit which includes a core circuit, the operating method comprising:
   monitoring a residency of an operating state, among a plurality of operating states, of the core circuit; and
   determining whether to inhibit the operating state according to the monitored residency,
   wherein the residency of the operating state is monitored as a ratio of the residency of the operating state to a total residency of the core circuit.

17. The operating method of claim 16, wherein the operating state is a current operating state of the core circuit or a requested operating state of the core circuit.

18. The operating method of claim 16, wherein the determining comprises, in response to the ratio of the residency, corresponding to an active duration, of the operating state reaching a predetermined residency value, inhibiting the core circuit from operating at the operating state.

19. The operating method of claim 16, wherein the determining comprises determining whether to inhibit the operating state according to a result obtained by comparing the monitored residency of the operating state and a predetermined residency value assigned to the operating state.

20. The operating method of claim 16, wherein the monitoring comprises:
   increasing a lifetime count value of the core circuit whenever a first count time elapses; and
   increasing a count value corresponding to the operating state whenever a second count time elapses.

* * * * *